Jan. 17, 1961  D. SCARAMUCCI  2,968,500
WIRE LINE OIL SAVER FOR USE WITH CYLINDRICAL PACKING
Filed May 3, 1957  2 Sheets-Sheet 1
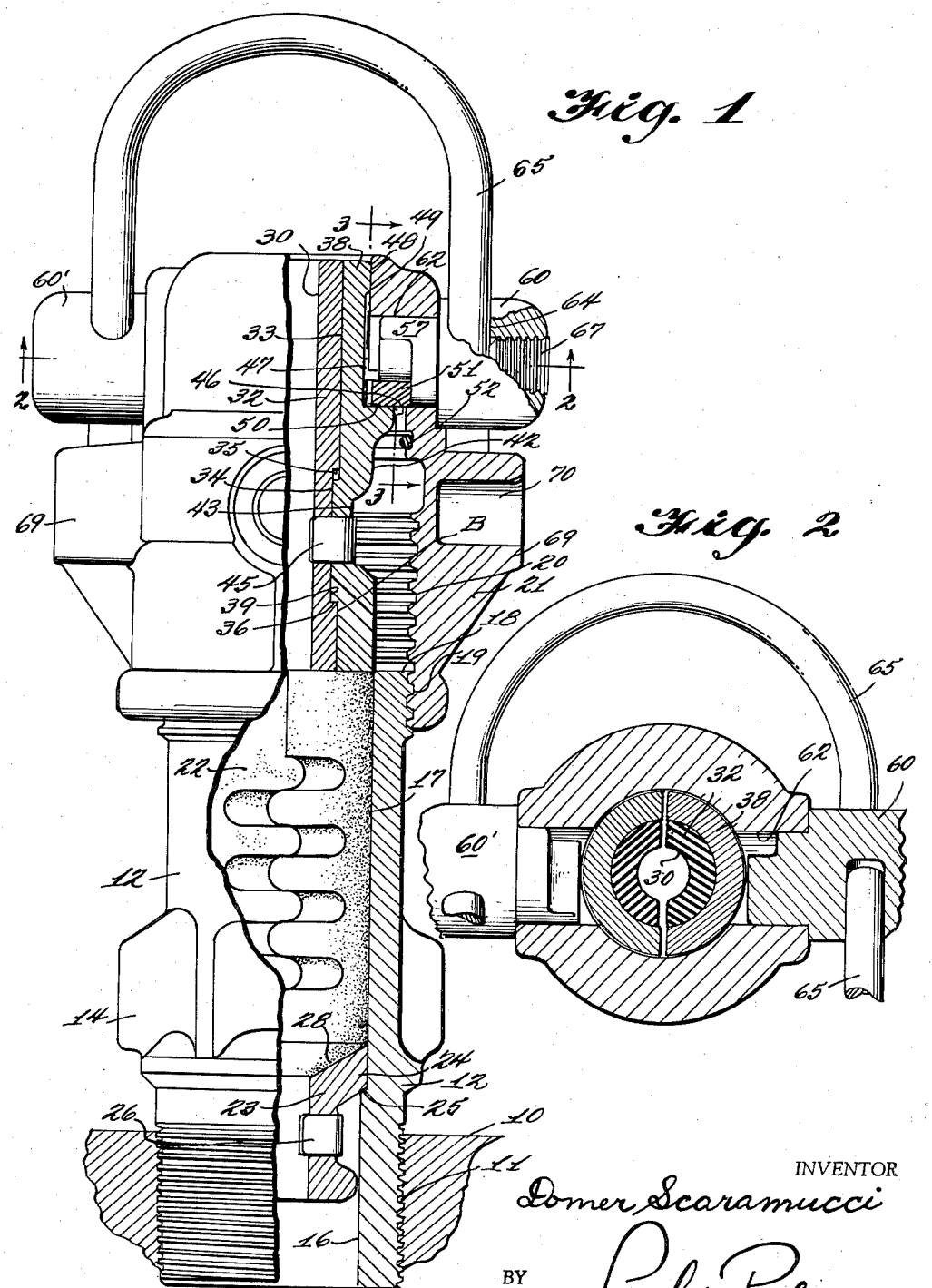
INVENTOR
Domer Scaramucci
BY
Leech & Radue
ATTORNEYS

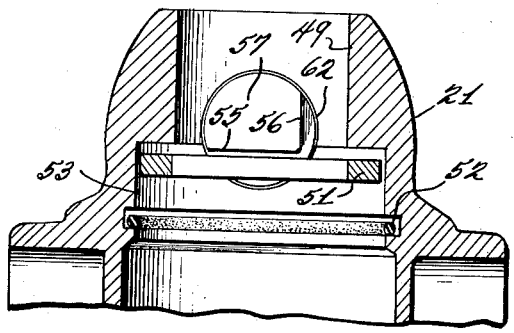
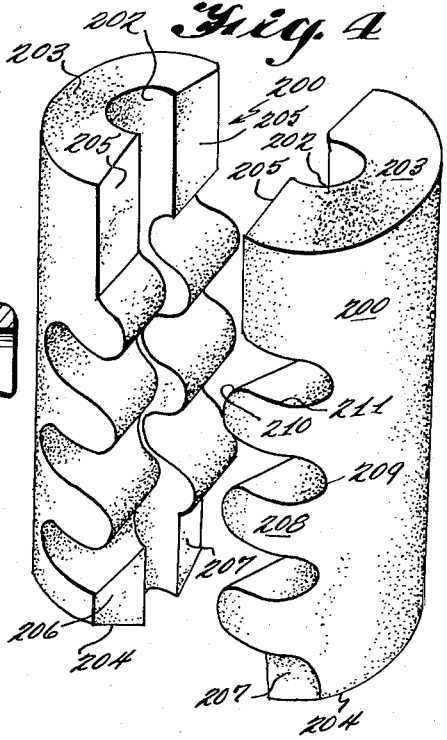
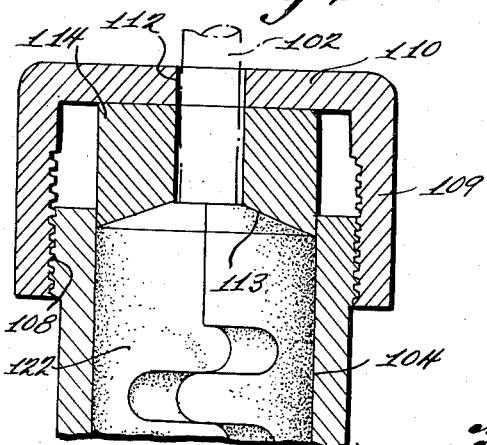
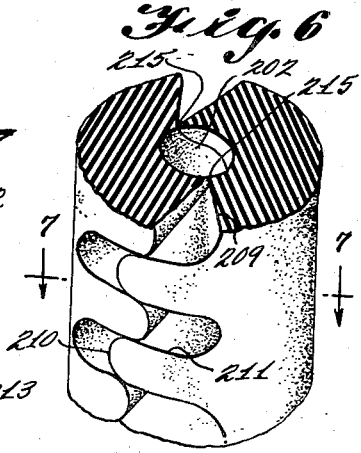
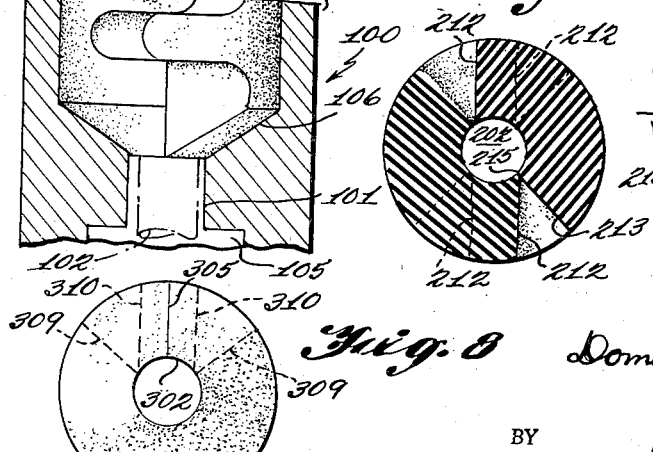
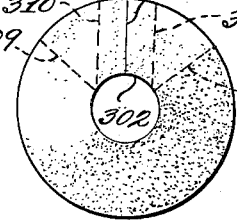

United States Patent Office 2,968,500
Patented Jan. 17, 1961

2,968,500

WIRE LINE OIL SAVER FOR USE WITH CYLINDRICAL PACKING

Domer Scaramucci, Box 4446, Oklahoma City, Okla.

Filed May 3, 1957, Ser. No. 656,784

8 Claims. (Cl. 286—16)

This invention relates to wire line oil savers and packing for use therewith or independently. Such devices are also known as wire line wipers or strippers, sand line oil savers, and the like, and serve basically as stuffing-boxes installed on the tubing at the head of an oil or gas well at times when swabbing and cleanout operations are being performed when they act to wipe, strip and pack off fluid or gas during running of the wire lines carrying clean-out tools.

The oil saver of the present invention is of the so called "cylindrical type" consisting of a normally round housing equipped with a ring, or cylindrically shaped, packing and the housing bore is of such size as to pass the rope socket on the end of the wire line while the packing and line guide bushings, as well as the packing itself, are longitudinally split to permit assembly over the line. Thrust means are provided for cooperation with the upper bushing to compress the packing longitudinally and cause it to expand radially inwardly to engage the wire and act similarly to the stuffing-box arrangement in piston pumps.

It is a general object of the present invention to provide a novel and improved wire line oil saver and a unique cylindrical packing for use with this and other forms of oil savers capable of cooperating with cylindrical packings.

More particularly it is an object of the invention to provide a wire line oil saver capable of performing not only the basic functions of housing the packing and providing means to compress and take up wear thereon, but including means for complementing the action of packing compression adjustment whereby the adjustment can be instantly released and reestablished at the exact setting prevailing before release, or at any subsequent desired setting, without the use of tools, whereby the packing may be loosened during running in of the wire and promptly set for sealing during withdrawal thereof.

An important feature of the invention comprises the provision of operating means for the packing release and quick compression mechanism which may be used, as the operating handle, for applying the initial compression adjustment, through screw mechanism, for the packing for taking up wear thereon and the like.

More specifically it is an object of the invention to provide, in a wire line oil saver, means for advancing the split upper compressor bushing toward the packing by threaded rotation of the bonnet of the assembly, whereby a pair of cams which bear on a circumferential flange extending from the bushing are advanced bodily to force the bushing downwardly to compress the packing, together with means for retracting the cams by rotation thereof, independent of movement of the bonnet, to permit release of the adjusted compression of the packing by a quick movement of a lever or handle and a subsequent recompression thereof to the exact adjusted condition previous to the release.

An important feature of the quick release and recompression mechanism comprises the use of a double horse-shoe-shaped handle arrangement adapted to surround the bonnet and arranged to swing in an arc of substantially 45 degrees to perform the function of compressing or releasing compression on the packing member. This type of handle provides for a minimum of interference to persons or objects passing adjacent to the well head, permits the use of two-handed operation, reduces pressure on the cam bearings and provides a convenient hand hold for initial or final packing adjustment.

Still another object of the invention resides in the construction of the packing of generally cylindrical form, centrally bored for wire line passage and longitudinally split for application over the line, the meeting edges of the split being fitted with interleaved fingers, the ends of which engage the bottoms of the slots between adjacent fingers on the facing edge only at the surface of the bore and diverge from there to the outer surface of the packing, whereby wear at the hole surface may be compensated for by substantially radial compression of the material of the packing without interference or distortion such as would be caused by lack of interfitting fingers and absence of the space provided by such divergence, thus permitting longer use of the packing.

Other and further objects and features of the invention will be more apparent to those skilled in the art upon a consideration of the accompanying drawings and following specification, wherein is disclosed a single exemplary embodiment of the wire line oil saver and several embodiments of the packing material with the understanding that such changes and modifications may be made therein as fall within the scope of the appended claims without departing from the spirit of the invention.

In said drawings:

Figure 1 is a longitudinal vertical section, partly in elevation, of a wire line oil saver constructed in accordance with the present invention and equipped with the packing forming a part thereof;

Figure 2 is a transverse section taken on line 2—2 of Figure 1, and further illustrating the cam mechanism for compressing or releasing the pressure on the packing;

Figure 3 is a fragmentary vertical section at right angles to that of Figure 1, and taken on broken lines 3—3 of Figure 1, showing the cams in "release" position;

Figure 4 is an exploded perspective view of the unique packing intended primarily for use with the wire line oil saver of Figures 1, 2 and 3, but capable of being used in other apparatus such as that shown in Figure 5;

Figure 5 is a longitudinal vertical section through a simple stuffing box adapted for use with the packing of Figure 4 and arranged to be tightened;

Figure 6 is a truncated perspective view of the packing elements assembled for use;

Figure 7 is a transverse section taken on line 7—7 of Figure 6; and

Figure 8 is a top plan view of a modification in which the packing is all in one piece split along one single joint using the same type of interlocking fingers shown on Figure 4.

Many times during the drilling of an oil or gas well, and subsequently during its producing life, it becomes necessary or desirable to introduce into the drill tubing, or the casing various types of tools, cleanout devices, measuring or recording instruments and the like and lower them on a wire line or cable, and often times such cable may be thousands of feet long. It is highly desirable under many circumstances to be able to seal off the well about the cable, first when lowering it so as to prevent the escape of gas or liquids under pressure from the well, and when withdrawing the cable, at which time not only is pressure in the well maintained, but the wire line is automatically wiped clean of oil and other accumulations thereon which may either be allowed to fall back into the tubing or may be withdrawn through appropriate lateral discharge valves arranged for the purpose.

The apparatus illustrated in the drawings accompanying this application is intended to be mounted at the top of a tubing or casing string to seal off the upper end thereof, and is provided with suitable guide bushings for the wire line and resilient and compressible packing and wiping material for forming a gas-tight but slidable fit with the surface of the wire line for the purposes previously mentioned.

Referring now to the drawings for a better understanding of the invention and first to Figures 1, 2 and 3, there is illustrated at 10 the wall of a tubing or casing string in an oil well, or the closure cap therefor, which may be drilled as at 11 and internally threaded as shown to receive the threads on the lower end of the body 12 of the oil saver assembly of the present invention, whereby a fluid tight joint is made between the pipe and teh oil saver body, with the latter vertically aligned with the axis of the pipe. The body 12 is essentially a hollow or tubular casting fitted exteriorly above the threaded section with appropriate lugs 14 circumferentially disposed thereabout for gripping by a wrench or other device for inserting or removing the body from the pipe. It is drilled internally at the lower end as shown at 16 to a diameter to pass any of the equipment intended to be introduced into the well on the wire line, and above this is cylindrically counterbored at 17 for the remainder of its height. The upper end 18 is cut off squarely, and externally below this end there is a section of threads 19 to adjustably engage internal threads 20 on the bonnet section 21.

The bonnet is an irregularly shaped casting internally bored at the lower end to accommodate the threads 20, which cooperate with those 19 on the body section 12 for the purpose of screwing the bonnet down to compress the packing material 22 shown accommodated in the cylindrical bore 17 of the body section, and supported therein by the bushing 23, the upper dished flange 24 of which rests on the shoulder 25 at the junction of the bore 16 and counter-bore 17. This bushing is preferably made from brass or bronze so as to be non-sparking and centrally bored to a diameter having a clearance of approximately 1/16 of an inch for the wire line adapted to pass through it.

The bushing 23 is divided into two halves on a diametrical plane, whereby it may be removed or assembled over the wire line when the latter is in position in the tubing. This permits replacement without withdrawing the line and removing the lower end hook fitting therefrom. An appropriate spring 26 surrounds the reduced diameter neck of the bushing and holds the two halves in assembled relationship for facilitating its introduction through the bore 17. When the bushing reaches the shoulder 25 the cooperation therewith and with the walls of the bore 17 serves to maintain its two sections in proper relationship. The collar spring 26 further prevents separation and loss of the two sections of the bushing should the latter be lifted by the hook on the end of the wire line at a time when the bonnet has been removed and the line is being withdrawn. The collar spring can readily be removed for separating the bushing parts.

The larger cylindrical bore 17 in the upper portion of the oil saver body is sized to accommodate the cylindrical resilient packing and wiping assembly 22, illustrated in Figure 1 and in greater detail in Figures 4 to 8 inclusive, but, for the purpose of the description of the housing mechanism therefor, may be assumed to be a cylindrical bushing with an internal bore sized to properly wipe the surface of the wire line and pack it against pressure loss from within the well. Like the bushing 23 it is preferably split into two parts along a diametrical plane, or optionally may be only split along one radius whereby it can be applied to or removed from the wire line when access to and end thereof is not available.

At least the lower end of the packing is shaped as a truncated cone, as shown at 28, and adapted to fit in a correspondingly shaped truncated conical recess in the upper end of bushing 23, whereby when vertical pressure is applied to the upper end of the packing the lower portion thereof is cause to be compressed radially for the purpose of engaging the line with a desired degree of tightness to provide the packing and sealing function thereof. As the bore of the packing material is continuously engaged, during its operation, by the rough surface of the wirel ine, and abradant material such as sand or the like which may be mixed with the oil on its surface as it is withdrawn, considerable wear takes place and this is compensated for by vertical pressure which is transferred into radially inward thrust, both by the conical surfaces in cooperation and by the distortion of the resilient packing as it is compressed longitudinally. This continually constricts the bore and insures fitting against the line for a long life of the packing.

While the upper end of the packing may also be truncated conically, it has been shown as cut off at right angles to the axis of the bore to accommodate the flat lower ends of the upper bushing assembly B housed within the bonnet 21 and sized to slide within the bore 17 when the bonnet is threaded down whereby to compress the packing. The internal bore 30 of the bushing assembly B is substantially the same as that of the bushing 23 and serves to closely guide the wire line leading from the winch at the derrick head and prevents any whipping action thereof from being transmitted to the more vulnerable inner surface of the packing, thereby preventing the latter from wearing so rapidly. A corresponding operation is effected by the lower bushing which prevents the transfer of line whipping to the packing wiper as well as provides the statoinary means for compressing the latter longitudinally and circumferentially. The bushings also ensure guidance of the wire line centrally of the packing in spite of any eccentricity or angularity in its lead to the well head.

The bushing B is in two concentric parts, each divided on a diametrical plane for the same reasons as pointed out in connection with the lower bushing 23. The inner bushing portion, or lining 32, is a brass or bronze casting having the cylindrical bore 30, previously referred to, and a cylindrical outer wall 33 which is reduced in diameter for a short distance intermediate its ends at 34 to provide shoulders 35 and 36, whereby it may be interlocked with the outer section 38 of the bushing against substantial longitudinal movement relative thereto. The outer section 38 circumferentially surrounds and closely fits the outer surface of the inner section and may be an iron or steel casting internally bored to receive the large dimension of the outer circumference of the inner bushing section and having an inwardly projecting portion 39 arranged to be received within the smaller dimensioned portion 34 in the nature of a circumeferential groove around the inner bushing, whereby to interlock them against relative longitudinal movement as previously mentioned. The two sections of the bushing are of the same length as shown, which is just somewhat short of the overall length of the bonnet 21, whereby the lower ends of the two parts of the bushing may bear on the upper end of the packing 22 to compress the latter when the bonnet is screwed down.

The lower part of section 38 of the bushing is irregularly shaped on the exterior, as shown at 42, and the minimum diameter 43 thereof a short distance above the lower end, and midway of the length of the interlocked section 34—39, is adapted to receive the girdle spring 45 as shown for the same purpose as the spring 26, i.e. to hold the several parts of the bushing together in assembled relationship before it is inserted into or after removal from the bore of the bonnet.

The diameter increases gradually and irregularly above the section reduced for accepting the girdle spring, to the maximum dimension at 46 whose overall diameter is greater than any other part of the bushing, and above this the dimension is cut down to that shown at 47, where a cylindrical portion extends almost to the upper end of the bushing where there is a slight enlargement in diameter to provide the cylindrical upper part 48, which slides closely within the bore 49 in the upper end of the bonnet to guide the longitudinal movement of the bushing assembly. The abrupt reduction in dimension from 46 to 47 produces the radial annulus 50 facing upwardly to accommodate the hardened thrust washer 51, which loosely fits the portion 47, and is assured against separation from the bonnet, when the latter is lifted off of the bushing assembly, by means of the lock ring 52 received in a circumferential groove in the side-walls of the enlarged bore 53 of the bonnet just below the bore 49 in which the bushing slides at its upper end.

This thrust washer 51 has a flat upper surface adapted to cooperate with cam surfaces 55 and 56, respectively, slabbed off from the cylindrical bearing sections 57 of diametrically disposed cam units 60 and 60¹. The cylindrical bearing sections previously referred to are longer than the slabbed off sections 55 and 56 to provide complete continuous circular bearing within the accommodating bores 62 in the walls of the bonnet near its upper end as best seen in Figure 2. The bores 62 on opposite sides of the bonnet are in axial alignment, and receive, guide and act as bearings for the parts 57 previously mentioned which are reduced in diameter from the main outer body portions of units 60 and 60¹ previously referred to. These outer parts project radially outwardly from the bonnet and each is diametrically bored with a circular hole 64.

The radially disposed holes 64 accommodate the abutting ends of two U-shaped operating bails 65, extending in the same plane from each end of the holes 60, whereby two-handed operation may be availed of, if desired, or for convenience a handle is available on either side for one-handed operation. Appropriate axially disposed recessed head set screws 67 in the ends of the parts 60, 60¹, fit in threaded bores intersecting those numbered 64 for clamping the bail sections to each other and into the assembly.

Directly below the cam assembly just described the bonnet casting is provided with a pair of protuberances 69, in the same vertical plane as the cam assemblies 60, 60¹, and directly beneath them. These protuberances are radially drilled as at 70 and operate to accommodate a suitable spanner wrench, or the like, for tightening the bonnet over the body to longitudinally compress the packing 22. The outer surfaces of the protuberances 69 act as stops to limit the throw of the bails controlling the movement of the cams. The total rotation permitted of the cams is approximately 90 degrees from the position shown in Figure 3 where the wider cam face 55, closer to the center of the bearing portion 57 thereof, is in engagement with the thrust washer 51 for relaxing pressure on the packing. As viewed in Figure 3, 90 degree rotation in a clockwise direction brings the more eccentric cam face 56 into engagement with the washer and compresses the packing. The faces 55 and 56 being flat as illustrated serve as self-locking means to hold the cam in either of the two positions in which it may be selectively set by 90 degree movement of the bails. The cam is shown in the relaxing position in Figure 3 as well as in Figure 1, and in the compressing position in Figure 2.

In operation, with the cams set to the compressing condition i.e. with the more remote faces 56 engaging the surface of the thrust washer, the bonnet is rotated by means of a suitable wrench, or the like, or even using the bails 65, until sufficient longitudinal pressure is put on the packing, dependent, of course, upon its condition of wear, until the walls of its bore engage the surface of the wire line with a proper degree of pressure to ensure the desired fluid and gas tightness for the operation about to be conducted with the wire line. This rotation, of course, acts through the threads 20 to lower or raise the bonnet in respect to the body, and apply appropriate longitudinal pressure to the packing which is converted into radial pressure by the cooperation of the truncated conical end and the cooperatingly shaped surface of the lower bushing, as well as the general displacement of the resilient material. At times, when it is permitted to lower the line without tightly sealing the same, the bails may be given a 90 degree rotation positioning the cams as shown in Figure 3 and releasing the tight pressure between the packing and the wire line, whereby the latter may drop more freely with less wear on the packing. However, when it becomes time to withdraw the wire line and it is necessary to wipe its surface clean of oil and paraffin and like deposits in order that this material may not be distributed all over the derrick floor and wound on the drum with the wire line, the bails are again given a 90 degree movement in the opposite direction positioning the more remote cam surfaces 56 for tightly compressing the packing to the exact condition it was at the time of making the adjustment setting by means of rotation of the bonnet. Thus the packing pressure may be released or re-established to its exact initial setting at any time by a simple operation of the bail handle.

The wire line oil saver of the present invention has just been described and defined in operation with any conventional form of split cylindrical packing for sealing off gas and fluid flow and wiping the line as it is being withdrawn, but it is preferred that the device be used with the unique packing now about to be described. This packing is capable of providing superior operation with the wire line oil saver just described, as well as much improved operation in more conventional types of devices such as are now available on the market, and even with such simple stuffing or packing boxes as the type illustrated in Figure 5, where a one-piece cylindrical shell 100 is bored as at 101 to provide a close guide for a wire line, piston rod, pump stem or the like, illustrated at 102. Above this the shell 100 is counterbored as at 104 to provide a cylindrical chamber of the proper diameter to receive a packing 122 of the type to be later described.

The upper surface of the web between the bore 105 of the shell 100 above the reduced diameter 101 is given a conical configuration as shown at 106 for the same purpose as the arrangement which conforms thereto in the lower bushing shown in Figure 1.

The upper outer surface of the shell 100 is threaded as at 108 to receive a simple, internally-threaded cap 109 having an end closure 110 centrally bored as at 112 to guide the piston rod 102.

In this construction the upper end of the packing is also truncated conical in shape as shown at 113, and is received in a correspondingly shaped opening at the lower end of the slidable bushing 114, whose flat upper end is borne against by the inner face of the closure 110 of cap 109. Thus by rotating the cap in respect to the shell the thrust bushing 114 may be pressed down longitudinally on the surface of the packing and provide for radially inward pressure at both the upper and lower ends thereof, thereby improving the wiping facilities and the ability to take up and adjust for wear.

Applicant's unique packing is illustrated in Figures 4, 6 and 7 in its preferred form, and in Figure 8 in a modification.

In the preferred form two half sections 200, 200 are illustrated, which are identical in construction so that when in positions to face each other, as shown in Figure 4, they may properly cooperate and interfit with each other. Each of the parts 200, 200 may be considered essentially as a half cylindrical annulus, each section having a half cylindrical longitudinal bore 202 appropriately diametered to receive and engage the surface of the wire line with which it is intended to be used.

In Figure 4 the upper ends of the sections are flat and at right angles to the axis of the bore 202, as indicated at 203, while the lower ends are tapered as seen at 204 to cooperate with the taper in the lower bushing of the oil saver. At their upper ends the sections 200 are semi-cylindrical as shown, having plane diametrical faces 205 which engage and complement each other to form a cylindrical section. At the lower end the face 206 is in the same plane as the face 205 directly above it, but the face 207 is cut back at a substantial angle so that the angle included between 206 and 207 is from 10 to 15 degrees less than 180 degrees. The corresponding cutaway in the other half is shown in the right hand section at the lower left. Under these circumstances when the two sections are mated there will be diametrically opposite sector-like portions at the bottom which are voids, their sides merging to engagement at the surface of the cylindrical bore 202.

Between the upper and lower portions just defined, each of the half sections of the packing at opposite sides of the central aperture is provided with alternate fingers 208 and separating notches 209, these fingers having parallel tops and bottoms and semi-cylindrical tips joining them. All of the fingers on each side of the bore on any one section have their tips lying in a plane, shown at 212 in Figure 7, which is substantially tangent to the central bore 202. On the other hand, the bottoms of the recesses 209 on opposite sides of either one of the sections lie in radial planes 213, as seen in Figure 7, and these two planes are coincident. Under these circumstances, as clearly illustrated in both Figures 6 and 7, there is a tight meeting of the tips and the recesses only at the surface of the bore 202, as clearly seen at 215, whereby the surface of the bore is substantially intact and any fluid wiped from the wire line thereby will not be able to pass out through the sector-shaped openings between the tips of the fingers and the bottoms of the recesses, since these are closed at the circumference of the bore. Furthermore, should there be any seepage through these openings, the tight engagement of the flat tops 203 of the packing sections, as well as the tight engagement of the full half sections of the packing at the top with the side walls of the chamber in which they are fitted ensures against fluids being able to remain on the surface of the wire line as it emerges from the top of the packing chamber whereby it is wiped clean and dry as is desired.

As previously mentioned, when the two packing sections are engaged about the wire line, the inner engaging edges of the fingers contact the walls of the voids at and near the wire line circle, and this condition remains substantially unaltered as wear occurs in the wire line bore. This wear cuts away the engaging portions at the tips of the sector-shaped recesses between the planes 212 and 213, as viewed in Figure 7, which recesses form the voids 216 best seen in Figure 6, which permits the fingers to continue to encircle or wrap about the line to maintain sealing contact. This wrapping is achieved by longitudinal pressure on the top of the packing sections converted in radially inward pressure, as previously described. Since rubber-like materials are deformable but not truly compressible i.e. their volume does not change substantially, a reduction in length by longitudinal pressure due to tightening the bonnet expands the rubber-like materials radially and circumferentially, which produces the wrap around to maintain the inner tips of the fingers against the walls of the voids adjacent the wire bore however much wear, within reason, occurs.

In operation, when installed in a suitable housing as shown in Figure 1, initial engagement with the surface of the wire line is secured by screwing down the nut and forcing the packing to enter the lower cone. It is clearly proven that only the slightest compression is required to obtain very effective wiping, sealing and pressure pack-off when oil or gas pressure is encountered during line operation. This is due to the relieved areas 215 permitting free and relaxed inward movement of the fingers as pressure forms below. Fluid cannot pass through the voids into the line bore, however, as the packing bore wears and as the fingers continue in the wrap around motion to hug the line for although the outside diameter tends to decrease, permitting fluid to travel up along the outside of the packing, the solid top sections act as a secondary packing-to-housing seal.

The top sections being solid resist distortion and transmit thrust downwardly to the more yieldable relieved members which act as seals against the line while the top sections maintain sealing contact with the walls at the top of the housing. Line wear and enlargement of the top section bore does not impair the sealing characteristics of the packing members since the fingered sections exclude fluid from entering into the line bore. Thus, damaging stress conditions to the sealing material is avoided in this design and slow even wear is realized until the voids are filled and the rubber assumes the status of a solid pack, at which point it should be replaced.

Obviously minor modifications may be made in the cylindrical packing devices shown generally in Figure 4. Such changes might include flats on one or both ends; conical on one or both ends and with the same or different inclinations; fingers and voids odd or even, on one or on both sides of each section; split through on both sides for full two-piece construction as shown in Figure 4, or split on one side only for one-piece design as illustrated in Figure 8.

This Figure 8 is merely the end elevation of a one-piece construction. In this construction the arrangement can best be visualized by assuming that the two pieces illustrated in Figure 4 have been joined together along one side leaving only one set of interlocking fingers and voids. Thus at the top of the packing the separation will be along the radial line 305 leading from the bore 302 to the outer circumference. Each dotted line 310 represents the tips of one set of the fingers, or looked at in another way the upper edge of the plane representing the terminus of these tips, while each dotted line 309 assumes a corresponding position in respect to the bottom of the voids. With this construction, in order to assemble the packing over the wire line or a pump or piston rod, or the like, it must be forced open with the fingers and spread around the wire or rod and allowed to return to the condition illustrated.

As pointed out, before, any of the several embodiments is capable of being used either in the line wiper assembly of Figures 1, 2 and 3, in a simple stuffing box arrangement as shown in Figure 5, or in any one of a number of well known commercial devices having an appropriate cylindrical bore to receive it and is capable therein of performing in a manner much superior to the conventional packing element containing two half cylindrical sections separated along a diametrical plane. The useful life of the packing illustrated is many times that of the simple type now in general use.

Having thus described my invention, what I claim as novel and desire to secure by Letters Patent of the United States is:

1. A wire line oil saver including in combination a tubular body adapted for connection to the upper end of a well head tubing; a wire guide bushing in the connection end of said body; a resilient packing substantially filling the remainder of the body and arranged to wipe a line passing therethrough; an enlarged bonnet threaded exteriorly over the upper end of said body and having a concentric bore through its upper end; a second wire guide bushing having a lower end engaging the upper end of said packing, sized to slide in said body to compress the packing, having an upper end sized to slide in said concentric bore and having an intermediate flange with a follower surface facing the upper end of said bonnet; a pair of cams journalled in and rotatable about a transverse axis in said bonnet and positioned to bear on said follower surface diametrically opposite each other, said cams having sufficient eccentricity to release compression applied to the packing through them and the second bushing by threaded adjustment of the bonnet and single means to simultaneously rotate said cams about their axis to apply or release compression.

2. In a wire line oil saver having a resilient packing type wiper confined in a tubular body between a fixed bushing and a longitudinally adjustable bushing, the combination of a bonnet threaded onto said body for confining and compressing said wiper, cam means acting between the bonnet and second bushing to transfer longitudinal movement of the bonnet as it is rotated on the body to said second bushing and means exterior to said bonnet to rotate said cam means to release the second bushing from pressure applied thereto resulting from bonnet adjustment, said cam means comprising diametrically opposed cams pivoted on separate shafts journalled in and extending through the side walls of said bonnet, said second bushing having a surface facing away from said wiper engaged by said cams, said means to rotate said cams comprising a U-shaped handle element having the end of each arm of the U attached to one of said cam shafts.

3. The device as defined in claim 2 in which the operating handle element comprises a closed substantially flat loop formed of two U-shaped elements surrounding the bonnet and having the centers of the loop reaches secured respectively to the cam shafts.

4. The device as defined in claim 3 in which said bonnet is provided with radial bosses, one adjacent each said shaft to act as stops for the loop when the shafts are rotated in either direction.

5. The device as defined in claim 4 in which said bosses are shaped and positioned to receive a spanner wrench to adjust the bonnet on the body.

6. The device as defined in claim 2 in which said cams are each provided with two flat dwells arranged substantially 90 degrees apart and of different displacements from the axis of rotation of the cam whereby they are self-locking in either position.

7. The device as claimed in claim 2 in which said second bushing has a radial flange facing said cams, a floating thrust washer on said flange and means in said bonnet to retain said thrust washer positioned therein when the bonnet is removed for access to said bushing.

8. A combined bushing and thrust unit for a wire line oil saver including in combination an internal tubular annulus of non-sparking metal divided longitudinally along a diameter into two parts, a shallow elongated channel in the outer surface thereof, a ferrous metal exterior tubular annulus of substantially the same length as the first and having an interior annular projection adapted to be received in said channel, said exterior annulus being similarly divided into two parts and sized to closely embrace the whole length of the first annulus, and an exterior annular enlargement on said exterior annulus having a radial face for engagement with thrust means.

References Cited in the file of this patent

UNITED STATES PATENTS

| | | |
|---|---|---|
| 554,548 | Stephens | Feb. 11, 1896 |
| 910,966 | Simon | Jan. 26, 1909 |
| 1,017,663 | Fraser | Feb. 20, 1912 |
| 1,172,374 | Leimer | Feb. 22, 1916 |
| 1,848,500 | Standlee | Mar. 8, 1932 |
| 1,875,936 | Saunders | Sept. 6, 1932 |
| 1,925,852 | Standlee | Sept. 5, 1933 |
| 2,160,292 | Scott | Mar. 30, 1939 |
| 2,187,884 | Mark | Jan. 23, 1940 |